United States Patent [19]

Salamon et al.

[11] Patent Number: 5,688,462
[45] Date of Patent: Nov. 18, 1997

[54] IN-RUNNER POLYMER MELT MIXER

[75] Inventors: Brent A. Salamon; Robert J. Donald, both of Midland, Mich.

[73] Assignee: The Dow Chemical Company, Midland, Mich.

[21] Appl. No.: 508,500

[22] Filed: Jul. 28, 1995

[51] Int. Cl.⁶ .................. B29C 45/30; B29C 45/72
[52] U.S. Cl. ............... 264/328.14; 264/328.17; 425/547; 425/567
[58] Field of Search ............. 264/328.17, 328.1, 264/328.8, 328.14, 328.15; 425/547, 549, 567, 572, 573

[56] References Cited

U.S. PATENT DOCUMENTS

| | | | |
|---|---|---|---|
| 3,508,298 | 4/1970 | Seidl . | |
| 4,027,857 | 6/1977 | Cunningham | 259/4 AB |
| 4,093,188 | 6/1978 | Homer | 366/336 |
| 4,123,496 | 10/1978 | Gallizia et al. | 264/328.8 |
| 4,255,367 | 3/1981 | Wallace et al. | 264/45.1 |
| 4,548,776 | 10/1985 | Holdredge, Jr. | 264/50 |
| 4,591,274 | 5/1986 | Sulin | 366/336 |
| 4,781,879 | 11/1988 | Oishi | 264/328.8 |
| 4,965,028 | 10/1990 | Maus et al. | 264/328.15 |
| 4,994,313 | 2/1991 | Shimizu et al. | 428/36.7 |
| 5,262,119 | 11/1993 | Smith | 264/328.8 |
| 5,266,246 | 11/1993 | Johnson et al. | 264/328.8 |
| 5,399,305 | 3/1995 | Bross et al. | 264/328.1 |

FOREIGN PATENT DOCUMENTS

| | | |
|---|---|---|
| 0 075 042 | 3/1983 | European Pat. Off. . |
| 0 293 756 | 12/1988 | European Pat. Off. . |
| 0 341 618 | 11/1989 | European Pat. Off. . |
| 55-009849 | 1/1980 | Japan . |

*Primary Examiner*—Jill L. Heitbrink

[57] ABSTRACT

In an injection molding process for making thermoplastic articles an in-runner static mixer is positioned near the gate to a mold cavity to mix molten thermoplastic such that said thermoplastic exiting the in-runner static mixer is more homogeneous with respect to temperature than that entering the in-runner static mixer. Passing the more homogeneously mixed molten thermoplastic through the gate to the mold cavity and allowing said cavity to fill and thermoplastic to cool, will result in an article aesthetically superior to one made by a process where no in-runner static mixing device is employed.

14 Claims, 2 Drawing Sheets

IN-RUNNER POLYMER MELT MIXER

BACKGROUND OF THE INVENTION

This invention relates to an injection molding process for making molded thermoplastic articles.

Molded thermoplastic material is used in a variety of products where aesthetic quality is important, such as in automotive interior trim parts and lawn and garden equipment. It is desired that these materials contain as few aesthetic flaws as possible.

In injection molding, a molten thermoplastic is injected under pressure into a mold cavity. After the plastic cools and solidifies, the mold cavity is opened and an article in the shape of the mold cavity is removed. During this molding process, expected weld lines may form due to the geometrical dimensions of the mold cavity and the number of gates through which the thermoplastic enters the mold cavity. In addition to these expected weld lines, aesthetic flaws including unexpected and undesirable weld lines, non-uniform gloss distribution, and/or splay can form.

Weld lines occur during the molding process when two or more flows of thermoplastic meet to form one flow. At this meeting point, a well-defined line may become visible when the thermoplastic cools. Nonuniform gloss distribution exists when certain areas of the molded thermoplastic article are highly glossy and other areas of the molded article are less glossy. Splay is characterized as discolored streaks (which often have a silvery appearance) on the surface of the molded part, aligned with the direction of flow.

Although industry has found methods to cope with non-uniform color distribution and non-uniform mold filling, most fail to cope with at least some of the aesthetic problems described above especially in making very large parts. For instance, the addition of excess colorant is frequently used to compensate for imperfect blending. This, however, increases operating expenses. Another example is the use of agitating mixers to further mix the thermoplastic after it has exited the injection unit. However, due to the high viscosity of molten thermoplastics, agitating mixers are typically inefficient. This not only results in an increase in operating expenses, but also impugns the thermoplastic with the energy required for agitation, thereby increasing the temperature of the thermoplastic. This increase in temperature concurrently increases the cooling time in the mold, which ultimately reduces production capacity.

Recent advances have utilized static mixers. These mixers have typically been located in nozzles of injection chambers or injection units to solve the problem of non-uniform color dispersion and non-uniform temperature distribution (Sulin U.S. Pat. No. 4,591,274, Cunningham U.S. Pat. No. 4,027,857). U.S. Pat. No. 4,994,313 employs a static mixer between the nozzle and mold cavity to divide, in a plurality of thin layers, two different kinds of thermoplastic resins in a process where containers are made. None of these processes have had success in rectifying the problems of unexpected weld lines and non-uniform gloss distribution.

What is desired is an inexpensive process for making molded thermoplastic articles containing as few unexpected weld lines as possible. Furthermore, it is desired that the molded thermoplastic articles made from such a process display more uniform gloss or color distribution and/or fewer or less severe splay.

BRIEF DESCRIPTION OF THE DRAWINGS

For a complete understanding of the process of the invention reference should be made to the following detailed description and accompanying drawings wherein.

Figure 1:
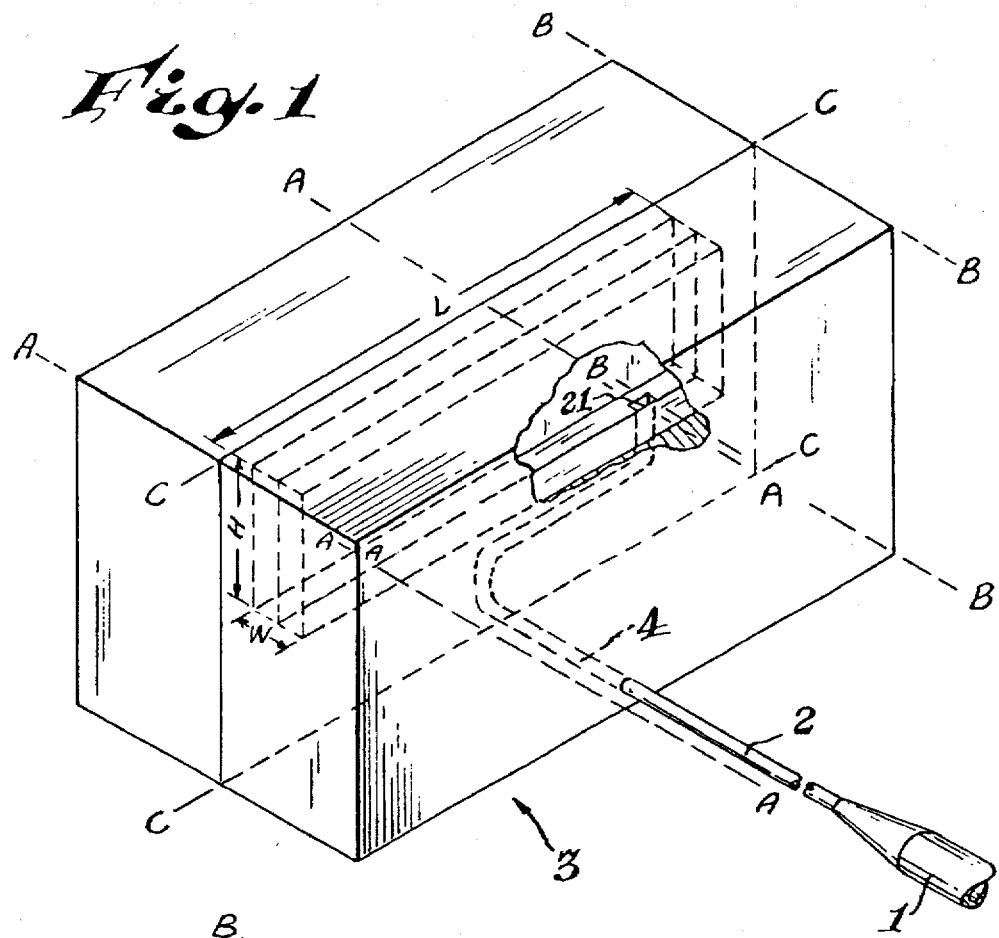
FIG. 1 is a perspective view of a thermoplastic transport system including a nozzle of an injection molding apparatus, transport channel that includes within it a runner, and a mold cavity assembly.

While the present invention is susceptible of embodiment in various forms, there is shown in the drawings and will hereafter be described one specific embodiment of the present invention, with the understanding that the present disclosure is intended as illustrative, and is not intended to limit the invention to the specific embodiment illustrated.

SUMMARY OF THE INVENTION

In one aspect, the invention is a process for producing a molded thermoplastic article which comprises: (a) injecting a molten thermoplastic through a nozzle and runner; (b) passing the molten thermoplastic through an in-runner static mixing device to acquire a more homogeneous mixture with respect to temperature; and then (c) passing the more homogeneously mixed molten thermoplastic through a mold gate and into a mold cavity.

In another aspect, the invention is a process for producing a molded thermoplastic article which comprises: (a) injecting a molten thermoplastic through a nozzle and runner; (b) passing the molten thermoplastic through an in-runner static mixing device, placed immediately upstream from a mold gate; and then (c) passing the molten thermoplastic through the mold gate and into a mold cavity.

In another aspect, the invention is a thermoplastic transport assembly for injection molding which comprises: (a) a mold cavity; (b) a gate located immediately adjacent to the mold cavity; (c) a runner in communication with the gate to the mold cavity; and (d) a static mixing device located within the runner, adjacent to the gate.

One of the benefits of this invention is that it provides a process for making molded thermoplastic articles that have better surface appearance as evidenced by fewer unexpected weld lines, more uniform gloss distribution, less splay, and/or more uniform color distribution.

Another benefit of this invention is that it provides a process in which there is less color streaking and faster color changes in the production of molded thermoplastic articles.

DETAILED DESCRIPTION OF THE INVENTION

FIG. 1 illustrates a thermoplastic transport system comprised of a nozzle of an injection molding apparatus 1, a transport channel 2, and a mold cavity assembly 3. As shown, molten thermoplastic is injected through the nozzle 1 and travels through the transport channel 2 into the mold cavity assembly 3. In the illustrated embodiment, a hot-runner assembly, where a jacket surrounds the hot-runner to provide heat, is shown as the transport channel 2. The temperature of the hot-runner is such that the thermoplastic remains molten and does not solidify during the molding cycle; i.e., the temperature is above the melting or softening point of the thermoplastic.

In other embodiments, a cold-runner (i.e., no heat is supplied to the transport channel 2) may be employed, or the molten thermoplastic may be injected from the nozzle 1 of an injection molding apparatus directly into mold cavity assembly 3, provided that the mold cavity assembly 3 contains a runner through which the molten thermoplastic is transported before passing through a gate into a mold cavity. In the embodiment shown in FIG. 1, the mold cavity assembly contains within it a runner 4 which transports molten thermoplastic to a mold cavity. In the embodiment shown in FIG. 1, the mold cavity assembly 3 opens (or draws) perpendicular to the plane C, and along lines A and B, whereupon a molded thermoplastic part is ejected at the end of the molding cycle.

An in-runner static mixer is located within the transport channel 2 or the mold cavity assembly 3. The in-runner static mixer is designed such that the molten thermoplastic is mixed as it navigates the baffles which comprise the mixer resulting in a more homogeneously mixed material with respect to temperature.

Figure 2:
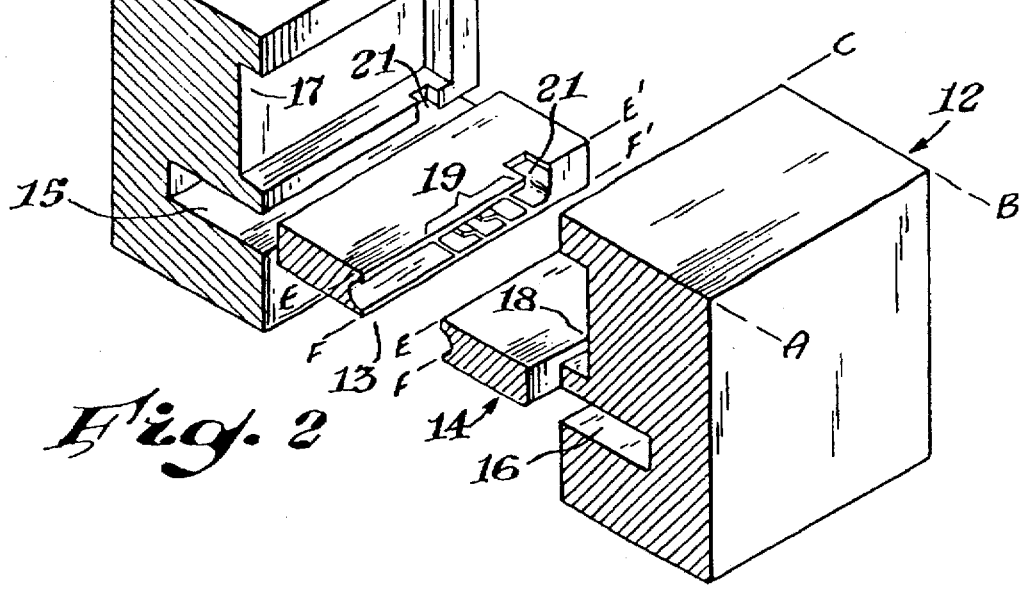
FIG. 2 is an exploded, perspective cutaway view of the components of a mold cavity assembly including an in-runner static mixer.

FIG. 2 illustrates a mold cavity assembly comprised of mold plates 11 and 12, and runner inserts 13 and 14. In the embodiment shown, mold plate 11 contains two cavities: a runner cavity 15 and a mold cavity 17. The runner insert 13 sits within the runner cavity 15. As shown, mold plate 12, like mold plate 11, also contains within it two cavities: a runner cavity 16 and a mold cavity 18. The runner insert 14 sits within the runner cavity 16. As illustrated in FIG. 2, a molded article will be made in the shape of the mold formed by mold cavities 17 and 18 when plates 11 and 12 are closed. Although not shown in the embodiment of FIG. 2, mold cavity inserts may be placed in mold cavities 17 and 18 to create molded articles which can have different shapes and sizes and/or different patterns on the surface of the articles. In another embodiment of this invention, a runner in communication with the mold cavities 17 and 18 may be a permanent channel in the mold plates 11 and 12 thereby obviating the runner inserts and their corresponding cavities 15 and 16.

Figure 3:
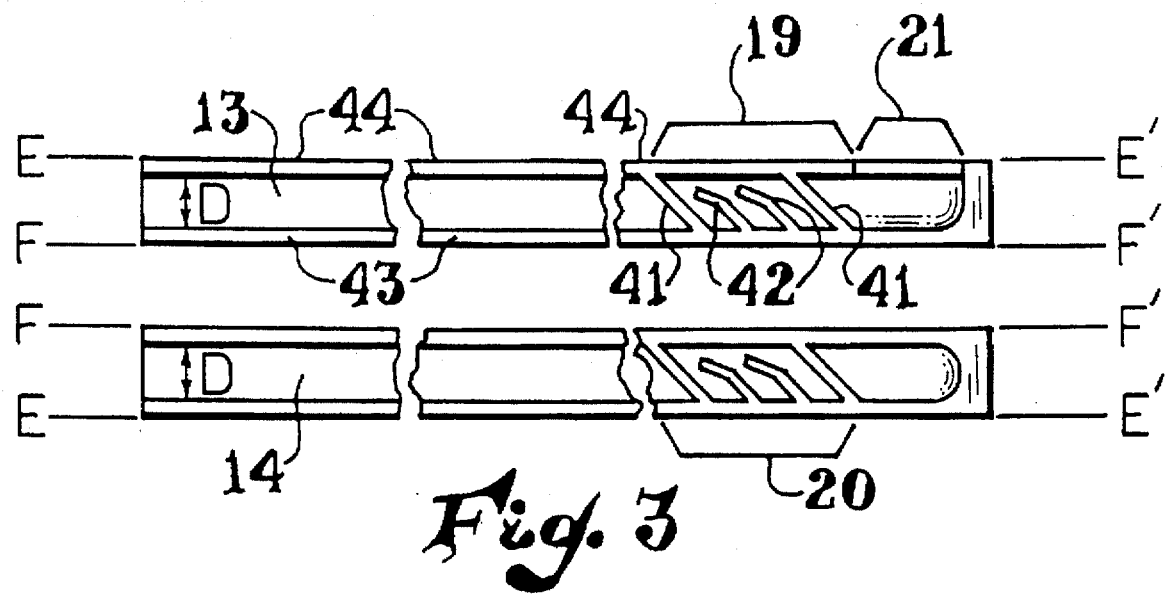
FIG. 3 is an enlarged, top view further illustrating the runner inserts shown in FIG. 2 which contain a static mixer.

When the mold cavity assembly of FIG. 2 is closed, a runner is formed by runner inserts 13 and 14 as edges E-E' and edges F-F' meet. The runner formed by runner inserts 13 and 14 delivers molten thermoplastic into the mold formed by mold cavities 17 and 18. As shown in FIGS. 2 and 3, each runner insert (13 and 14) contains an in-runner static mixer 19 and 20. These in-runner static mixers 19 and 28, as well as the runner inserts 13 and 14, are further illustrated in FIG. 3.

In the embodiment shown in FIG. 3, in-runner static mixer 19 is identical to the in-runner static mixer 28 located within runner insert 14. The runner inserts 13 and 14 are further identical, except that runner insert 13 contains a gate 21, through which the thermoplastic enters the mold cavity. Thus, when these runner inserts 13 and 14 are placed within their corresponding runner cavities 15 and 16, thermoplastic material will be forced to navigate the baffles within the runner comprising the static mixing device. Once the thermoplastic passes through the static mixing device, it is forced into the mold cavity through a gate 21 located in runner insert 13 after the in-runner static mixer 19.

As shown, in-runner static mixer 19 of FIG. 3 includes baffles 41 and 42 within a half-round runner having a diameter D. Note that the shape of the runner formed by runner inserts 13 and 14 is not critical to the invention, and may be round, elliptical, square, rectangular, or any other convenient shape. In the embodiment shown in FIGS. 1 and 2, the draw of the mold is perpendicular to the plane C, along lines A and B. Thus, after the molded article has cooled and solidified, the mold cavity assembly 3 draws perpendicular to C, along A and B, and the solid thermoplastic in the shape of the mold (formed by mold cavities 17 and 18) and the runner (formed by the runner inserts 13 and 14) is expelled. In the embodiment shown, baffles 41 and 42 are aligned with the draw of the mold. As shown, the baffles 41 and 42 shown radially fill that portion of runner insert 13 such that flow is only permissible around or over the baffles; there is no flow under the baffles. As shown, all baffles are attached to runner edge 43. In the embodiment shown, the baffles in runner insert 14 are similarly arranged.

In the embodiment shown in FIG. 3, the baffles 41 are separated from each other by 2.54 runner diameters (i.e., 2.54×D), and form 45° angles with runner edge 43. Baffles 41 are 1.41 runner diameters in length, and extend 100 per cent of the distance between runner edges 43 and 44.

In the embodiment shown in FIG. 3, the baffles 42 are separated from each other by 0.77 runner diameters, and are aligned with runner edge 43 at an angle of 45°. Baffles 42 extend 77 per cent of the distance between runner edges 43 and 44. At 50 per cent of the distance between runner edges 43 and 44, baffles 42 bend and are aligned with runner edge 43 at an angle of 30°. Baffles 42 are 1.31 runner diameters in length.

The invention, however, is not limited to the foregoing specifications regarding baffle sizes and their arrangement within the runner. One purpose of the static mixing device is to mix the molten thermoplastic such that the thermoplastic material exiting the static mixing device is more homogeneous with respect to temperature than the thermoplastic entering the static mixing device. Therefore, a static mixing device comprised of baffles of different arrangements and sizes may be employed provided that it mixes the thermoplastic material accordingly. In addition, the length of the static mixer can vary and, in fact, may consist of widely spaced baffles in contrast with the embodiment described herein. It is also possible that the static mixer employed in the process may have a diameter larger than that of the runner to reduce pressure and/or excess heat build-up.

A molten thermoplastic is injected through a nozzle of an injection molding apparatus 1 and transport channel 2, into mold cavity assembly 3. Within the transport channel 2 is a runner which, as shown, is heated by a heating jacket. Within the mold cavity assembly 3, the thermoplastic material flows through a runner formed by runner inserts 13 and 14 and through an in-runner static mixing device comprised of static mixers 19 and 20, through a gate 21 and into a mold formed by mold cavities 17 and 18 wherein the thermoplastic cools, and forms a part in the shape of the mold.

Any thermoplastic capable of being injection molded may be used in the process of this invention. Some common types of thermoplastics which may be used include: acrylonitrile-butadiene-styrene (ABS), polycarbonate, polystyrene, high impact polystyrene, nylons, polypropylene, polyethylene, poly(ethylene terephthalate), poly(vinyl chloride), polyurethanes, and mixtures and/or blends thereof.

Any type of injection unit may be used. The molten thermoplastic leaving the injection unit must be at a melt temperature and pressure sufficient to maintain flow through the transport channel and into the mold cavity assembly. The thermoplastic is then injected through a nozzle and then into a runner. The runner provides the means for transporting the injected molten thermoplastic to the mold.

In conventional molding processes, several problems, such as undesired weld lines, uneven gloss or color distribution, and/or splay, may occur. Applicants believe that these undesired effects are caused at least in part by the high shear the molten thermoplastic experiences while passing through the runner. Shearing occurs due to flow, and Applicants believe this shearing and the high viscosity of thermoplastics in general causes the temperature of the thermoplastic to rise as it moves through the runner. Due to the particularly high shear rates at the wall of the runner and poor thermal conductivity of thermoplastics in general, a radial temperature gradient develops; i.e., the material near the wall of the runner is at a higher temperature than the material near the core of the runner.

Since viscosity is an inverse function of temperature, it is believed that a radial viscosity gradient forms in the polymer as it passes through the runner. Under similar processing conditions, highly viscous fluids flow slower than less viscous fluids. This non-uniform velocity results in two or more different flow fronts within the mold cavity; i.e., secondary flow. As the mold fills, weld lines form as a result of this secondary flow.

Splay can also form within the secondary flow in the conventional process. It is believed that splay occurs when the thermoplastic begins to degrade at the high temperatures which are generated by the shearing as the thermoplastic travels through the runner and part. The degradation of the polymer causes gas bubbles to form which have a tendency to travel faster than the thermoplastic material. When the molten thermoplastic exits the gates and begins filling the mold cavity, these gas bubbles leave noticeable streaks, typically within the secondary flow.

Secondary flow is also believed to be responsible for the gloss difference found in secondary flow portions of the cooled thermoplastic article made in the conventional process. It is also believed that temperature gradients themselves contribute to uneven gloss distribution, apart from the effects of the secondary flow. In the conventional process, these temperature differences cause distortions in morphology causing certain areas of the molded part to appear more glossy than other areas. It is believed that temperature gradients can also contribute to non-uniform color distribution.

Applicants have found that by passing the thermoplastic through a static mixer before it enters the gate to the mold, the thermoplastic is more homogeneously mixed with respect to temperature. It is believed that the baffles comprising the static mixer cause the hot thermoplastic material near the wall of the runner to mix with the cooler material near the core of the runner. The thermoplastic exiting the static mixer lacks the radial temperature gradients believed to be formed as the thermoplastic passes through the runner and, thus, is more homogeneous with respect to temperature and viscosity. As a result, the secondary flows are reduced or eliminated, therefore, the molded articles contain fewer or less severe weld lines, more uniform gloss and/or color distribution, and/or less severe splay.

If the thermoplastic is transported through a runner after it has passed through a static mixer but before it enters the gate to the mold, due to the high shearing near the walls of the runner, radial temperature and viscosity gradients may redevelop. This is particularly true when the thermoplastic has low thermal conductivity, when the thermoplastic is highly viscous, when the flow rate is high, when the runner cross-section is small, and/or when the molded part is large. Therefore it is advantageous to locate the static mixer as close to the gate as feasible, preferably not more than 75 runner diameters from the gate, more preferably not more than 20 runner diameters from the gate, even more preferably not more than 10 runner diameters from the gate, and even more preferably not more than 5 runner diameters from the gate. Most preferably, the static mixer is located immediately adjacent to the gate. By "immediately adjacent to the gate" it is meant that the baffles closest to the gate are within 2 runner diameters of the gate.

The term "diameter" refers to the hydraulic diameter of the runner as defined in Table 5–8 of PERRY'S CHEMICAL ENGINEERS' HANDBOOK, 5–25 (6th ed. 1984). The hydraulic diameter is defined in PERRY'S as 4 times the area of stream cross section divided by the wetted perimeter. The phrase "runner diameters" refers to the diameter of the portion of the runner immediately downstream of the static mixer. In the case where there is no runner downstream of the static mixer, the phrase "runner diameter" refers to the diameter of the mixer at the point of egress of the molten thermoplastic.

As a supplementary method of determining the location of the static mixer, it is preferred to locate the static mixer not more than 75 centimeters (cm) from the gate, more preferably not more than 30 cm from the gate, and most preferably not more than 5 cm from the gate.

The injection molding process may use a cold-runner system for delivering the thermoplastic from the injection unit to the mold cavity. At the conclusion of such a process, the molded part is connected to a scrap piece of cooled thermoplastic in the shape of the runner. It is advantageous to design the static mixer such that the cooled thermoplastic can be easily removed from the runner and mixer.

In the embodiment illustrated in FIGS. 2 and 3, it is preferred that the portion of the runner insert containing the static mixer be removable. Such a construction facilitates disassembly for cleaning and other maintenance, as well as for substitution of components in accordance with the thermoplastic material being used, the desired flow rates and pressure drops, and the desired physical characteristics of the molded article. These features also permit the in-runner static mixer to be readily adapted for use in an existing mold cavity assembly.

Injection molding processes employing a hot-runner system to transport thermoplastic material to the gates to molds may also contain in-runner static mixers. These static mixers can have baffles of any size, shape and/or alignment, provided that the requisite increased homogeneity with respect to temperature is achieved, since no cooled thermoplastic material must be removed from a hot-runner system.

After passing through the in-runner static mixer in the embodiment illustrated in FIG. 2, the more homogeneously mixed thermoplastic passes through a gate 21, fills the mold formed by mold cavities 17 and 18, and then cools. When the thermoplastic is passed through a static mixer in accordance with this invention, it has been found that molded thermoplastic articles contain fewer unexpected weld lines, fewer or less noticeable instances of splay and/or better, more uniform, gloss and color distribution throughout the article.

The finished products are useful in a variety of applications especially in those where aesthetic appearance is important such as in automotive interior trim parts, computer casings, telephone casings, and lawn and garden parts.

The following examples are provided to illustrate the invention but are not intended to limit the scope thereof.

Comparative Sample Run A

This comparative sample run illustrates a process for making a molded thermoplastic article without the use of an in-runner static mixing device where the molded article contains unexpected weld lines and areas of uneven gloss.

An injection molding apparatus described generally in FIGS. 1 and 2 is used in the process with the following exceptions. First, there is no in-runner static mixing device within the transport system of this process. Second, the molten thermoplastic is injected from a nozzle 1 directly into a runner 4 of a mold cavity assembly 3. In other words, there is no transport channel 2 in this process, and the only runner is that contained within the mold cavity assembly.

The runner 4, attached to the nozzle 1, has an inner diameter (D) of 9.5 millimeters (mm) throughout and a total length of 305 mm. The runner is arranged so that for the first 110 mm of the 305 mm the runner transports material horizontally, in the same direction as the flow out of the nozzle. Thereafter the runner bends vertically 90°. The length of this vertical portion of the runner is 80 mm. The runner then bends horizontally 90°. The length of this horizontal portion of the runner is 115 mm. At the end of this horizontal portion of the runner is the gate through which the thermoplastic enters the mold cavity.

The gate to the mold cavity has dimensions of 1.5 mm by 18 mm and is located near a corner of the mold as shown in FIG. 1. The mold cavity sits vertically within the mold cavity assembly as shown in FIG. 1. The mold cavity is in the shape of a rectangular box with the dimensions height (H)=214 mm, length (L)=277 mm, width (W)=3.2 mm.

210 grams of molten MAGNUM™ 342EZ (an acrylonitrile-butadiene-styrene thermoplastic sold by The Dow Chemical Co.), is injected through a nozzle and directly into a mold cavity assembly at 205° C. and a constant flow rate of 150 g/sec. Accordingly, the injection time (i.e., the time to fill the mold) is about 1.38 seconds.

After the molten thermoplastic fills the mold and cools, the mold cavity assembly then draws along lines A and B. The molded article is then ejected.

Figure 4:
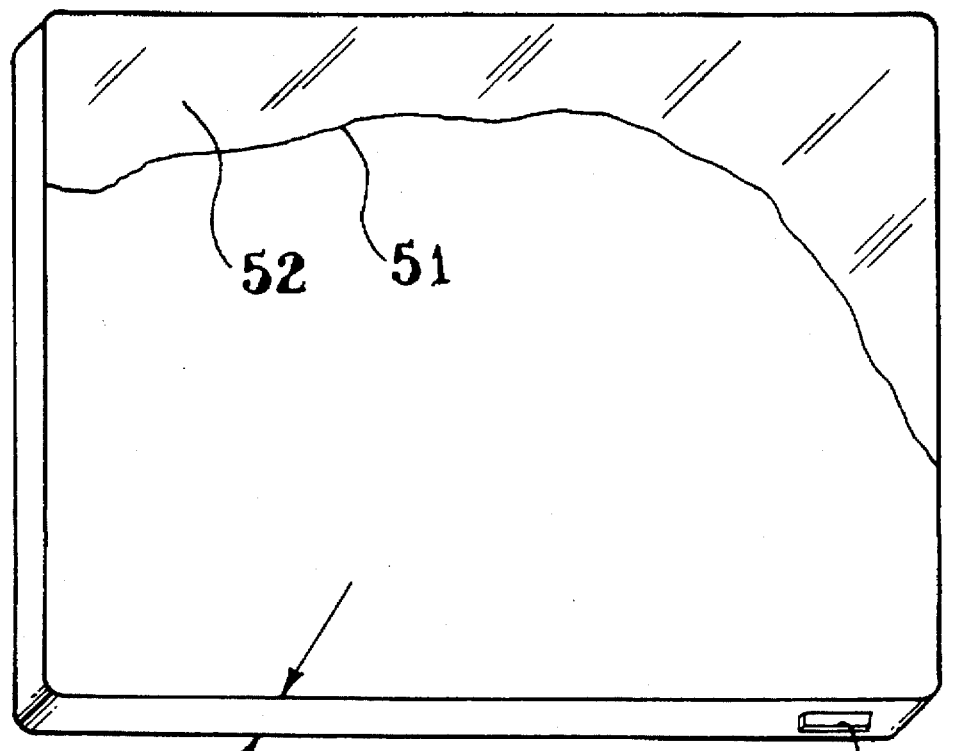
FIG. 4 is a top view of a mold plaque made in a prior art process without the use of an in-runner static mixer.

As shown in FIG. 4, a plaque 50 is formed by the mold and has the same dimensions as the mold. For reference, the area denoted by 53 in FIG. 4 corresponds to the gate through which the molten thermoplastic entered the mold cavity. The plaque 50 contains one unexpected and undesirable weld line that corresponds to line 51. The plaque 50 further contains an area 52, that is much more glossy than the rest of the plaque. It is believed that this region of gloss corresponds to a secondary flow that occurs in this molding process.

Example 1

This sample run illustrates a process for making molded thermoplastic articles with the use of an in-runner static mixing device where the molded article contains no unexpected weld lines and no noticeable areas of high gloss.

The apparatus described in Comparative Sample Run A is used here, with the following exceptions. An in-runner static mixer as shown in FIG. 3 is located such that the distance between the gate and the baffle closest to the gate is 0 mm.

The processing conditions used in this sample run are identical to those in Comparative Sample Run A.

A plaque in the shape of, and with the same dimensions as, the mold is produced. This plaque has the same dimensions as that of Comparative Sample Run A (277 mm×214 mm×3.2 mm). The molded article produced using the static mixing device contains no unexpected weld lines, or areas that are more glossy than other areas. The article made by the process utilizing an in-runner static mixer is aesthetically superior to the one produced in Comparative Sample Run A where no in-runner static mixer was used.

What is claimed is:

1. A process for producing a molded thermoplastic article which comprises:
   a. injecting a molten thermoplastic through a nozzle and cold runner;
   b. passing the molten thermoplastic through a cold in-runner static mixing device to acquire a more homogeneous mixture with respect to temperature; and then
   c. passing the more homogeneously mixed molten thermoplastic through a mold gate and into a mold cavity.

2. The process of claim 1, wherein in step (b) the in-runner static mixing device is placed within 20 runner diameters of the mold gate.

3. The process of claim 1, wherein in step (b) the in-runner static mixing device is placed within 2 runner diameters of the mold gate.

4. The process of claim 1, wherein in step (b) the in-runner static mixing device is placed within 30 centimeters of the mold gate.

5. The process of claim 1, wherein in step (b) the in-runner static mixing device is placed within 5 centimeters of the mold gate.

6. The process of claim 1, wherein the thermoplastic article exhibits no weld lines formed as a result of secondary flow of the molten thermoplastic.

7. A process for producing a molded thermoplastic article which comprises:
   a. injecting a molten thermoplastic through a nozzle and cold runner;
   b. passing the molten thermoplastic through a cold in-runner static mixing device, placed immediately upstream from a mold gate; and then
   c. passing the molten thermoplastic through the mold gate and into a mold cavity.

8. The process of claim 7, wherein the thermoplastic article exhibits no weld lines formed as a result of secondary flow of the molten thermoplastic.

9. A thermoplastic transport assembly for injection molding comprising:
   a. a mold cavity;
   b. a gate located immediately adjacent to the mold cavity;
   c. a cold runner in communication with the gate to the mold cavity; and
   d. a cold in-runner static mixing device located within the runner adjacent to the gate.

10. The assembly of claim 9, wherein in step (d) the in-runner static mixing device is placed within 20 runner diameters of the gate.

11. The assembly of claim 9, wherein in step (d) the in-runner static mixing device is placed within 2 runner diameters of the gate.

12. The assembly of claim 9, wherein in step (d) the in-runner static mixing device is placed within 30 centimeters of the gate.

13. The assembly of claim 9, wherein in step (d) the in-runner static mixing device is placed within 5 centimeters of the gate.

14. A thermoplastic transport assembly for injection molding comprising:
   a. a mold cavity;
   b. a gate located immediately adjacent to the mold cavity;
   c. a cold runner in communication with the gate to the mold cavity; and
   d. a cold in-runner static mixing device located within the runner immediately adjacent to the gate.

* * * * *